US011714610B2

(12) United States Patent
Karri et al.

(10) Patent No.: US 11,714,610 B2
(45) Date of Patent: Aug. 1, 2023

(54) SOFTWARE CODE INTEGRATION FROM A MEDIA FILE (71) Applicant: INTERNATIONAL BUSINESS MACHINES CORPORATION, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Krishna Reddy Venkata Batchu, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/304,387

(22) Filed: Jun. 21, 2021

(65) Prior Publication Data
US 2022/0405062 A1    Dec. 22, 2022

(51) Int. Cl.
G06F 9/44       (2018.01)
G06F 9/445      (2018.01)
G06F 9/455      (2018.01)
G06F 8/33       (2018.01)
G06F 11/36      (2006.01)
G06F 8/41       (2018.01)

(52) U.S. Cl.
CPC .................. G06F 8/33 (2013.01); G06F 8/41 (2013.01); G06F 11/3664 (2013.01)

(58) Field of Classification Search
CPC ........... G06F 8/33; G06F 8/41; G06F 11/3664
See application file for complete search history.

(56) References Cited

U.S. PATENT DOCUMENTS 10,705,943 B2 *  7/2020  Makkar ................. G06N 5/022
2011/0258611 A1   10/2011  Dutta
(Continued)

FOREIGN PATENT DOCUMENTS

CN        112394942 A  *  2/2021  ............... G06F 8/41
CN        112840336 A  *  5/2021  ....... G06F 16/24573
(Continued)

OTHER PUBLICATIONS

Brock Angus Campbell, NLP2Code: Code Snippet Content Assist via Natural Language Tasks, 2017, pp. 1-5. https://ieeexplore.ieee.org/stamp/stamp.jsp?tp=&arnumber=8094469 (Year: 2017).*
(Continued)

*Primary Examiner* — Mongbao Nguyen
(74) *Attorney, Agent, or Firm* — Tihon Poltavets (57) ABSTRACT

A method for software code integration from media files includes comparing portions of development code in an integrated development environment to a plurality of classified portions of a plurality of media files. The method also includes identifying a first classified portion of a first media file from the plurality of media files for integration into the development code, where the first classified portion includes a first snippet of code associated with a first function. Responsive to receiving a user confirmation, the method also includes extracting the first snippet of code associated with the first function. The method also includes integrating the first snippet of code associated with the first function into the development code in the integrated development environment.

20 Claims, 6 Drawing Sheets

(56) References Cited

U.S. PATENT DOCUMENTS

| | | | | |
|---|---|---|---|---|
| 2013/0073961 | A1* | 3/2013 | Agnoli | G11B 27/034 715/716 |
| 2013/0239090 | A1 | 9/2013 | Hamlin | |
| 2016/0063102 | A1* | 3/2016 | Yahav | G06V 20/48 382/182 |
| 2017/0017658 | A1* | 1/2017 | Blong | G06F 16/44 |
| 2017/0083290 | A1 | 3/2017 | Bharthulwar | |
| 2019/0236975 | A1 | 8/2019 | Chong | |
| 2019/0250891 | A1* | 8/2019 | Kumar | G06K 9/6218 |
| 2020/0104102 | A1* | 4/2020 | Brockschmidt | G06F 8/65 |
| 2020/0125575 | A1* | 4/2020 | Ghoshal | G06F 40/247 |
| 2020/0160458 | A1* | 5/2020 | Bodin | G06F 8/33 |
| 2021/0026623 | A1* | 1/2021 | Me | G06F 8/33 |
| 2021/0109718 | A1* | 4/2021 | Brown | G06F 8/35 |
| 2021/0141615 | A1* | 5/2021 | Lundvall | G06F 8/70 |
| 2021/0150263 | A1* | 5/2021 | Corwin | G06F 18/40 |
| 2022/0317978 | A1* | 10/2022 | Barik | G06F 8/20 |
| 2022/0317979 | A1* | 10/2022 | Araujo Soares | G06F 8/33 |
| 2022/0358286 | A1* | 11/2022 | Wilson-Thomas | G06F 40/284 |

FOREIGN PATENT DOCUMENTS

| | | | |
|---|---|---|---|
| KR | 102095863 | B1 * | 4/2020 |
| KR | 102224785 | B1 * | 3/2021 |

OTHER PUBLICATIONS

Luca Ponzanelli, Automatic Identification and Classification of Software Development Video Tutorial Fragments, 2019, pp. 464-485. https://www.inf.usi.ch/faculty/bavota/papers/codetube-tse.pdf (Year: 2019).*

Agnese Chiatti, Text Extraction and Retrieval from Smartphone Screenshots: Building a Repository for Life in Media, 2018, pp. 948-955. https://dl.acm.org/doi/pdf/10.1145/3167132.3167236 (Year: 2018).*

Dethe Tukaram, Design and Development of Software Tool for Code Clone Search, Detection, and Analysis, 2019, pp. 1-5. https://ieeexplore.ieee.org/stamp/stamp.jsp?tp=&arnumber=8821928 (Year: 2019).*

Luca Ponzanelli, Automatic Identification and Classification of Software Development Video Tutorial Fragments, 2019, pp. 464-485. https://ieeexplore.ieee.org/stamp/stamp.jsp?arnumber=8128506 (Year: 2019).*

Disclosed Anonymously, "Method of approach to provide embedded guidance to perform tasks in IDE", IP.com: IPCOM000198595D, Aug. 10, 2010, pp. 1-4.

Mell et al., "The NIST Definition of Cloud Computing", National Institute of Standards and Technology, Special Publication 800-145, Sep. 2011, pp. 1-7.

* cited by examiner

SOFTWARE CODE INTEGRATION FROM A MEDIA FILE

BACKGROUND

This disclosure relates generally to software code integration, and in particular to integrating software code sourced from a media file in an integrated development environment.

An integrated development environment (IDE) is software utilized for creating applications that combing common developer tools into a single graphical user interface (GUI) with which a user interacts. A typical IDE includes a source code editor for assisting the user with code creation, a local build automation for automating repeatable tasks as part of creating a local build of software, and a debugger for testing other programs that can visually display in a GUI the location of a bug in the code. An IDE also allows for the user to utilize code snippets from various locations by importing the code snippets from the various locations into the code being created by the user.

SUMMARY

Embodiments in accordance with the present invention disclose a method, computer program product and computer system for software code integration from media files, the method, computer program product and computer system can compare portions of development code in an integrated development environment to a plurality of classified portions of a plurality of media files. The method, computer program product and computer system can identify a first classified portion of a first media file from the plurality of media files for integration into the development code, wherein the first classified portion includes a first snippet of code associated with a first function. The method, computer program product and computer system can, responsive to receiving a user confirmation, extract the first snippet of code associated with the first function. The method, computer program product and computer system can integrate the first snippet of code associated with the first function into the development code in the integrated development environment.

DETAILED DESCRIPTION

Embodiments of the present invention include a code integration module for integrating software code sourced from a media file into development code in an integrated development environment. As a user modifies code in the integrated development environment, the code integration module can receive a user selection or provide a selection of one or more portions of a media file (e.g., image or video) that include snippets of code for integration into the development code. The code integration module can perform video analysis on the media file to identify textual content relating to code and identify code based on the textual content. The code integration module can classify portions of the media file based on code functionality and store the classified portions of the media file in a media library accessible through the integrated development environment. The code integration module can analyze the development code and identify classified portions of a media file for integration into the development code based on required functionality. Code integration module presents the identified classified portions of the media file to the user for selection and confirmation of inclusion into the development code. Alternatively, code integration module receives a user selection for a classified portion of a media file for integration into the development and learns user preferences for future identification of classified portions.

The code integration module extracts one or more code snippets from each of the classified portions of the media file and displays any compilation errors during the integration process between the extracted one or more code snippets and the development code. By integrating the extracted one or more code snippets, the code integration module creates a single process flow for the development code that includes the desired functionality. The code integration module can continuously learn with each code snippet integration into the development code to identify user coding patterns and preferences when integrating the classified portions of media files in the development code. The code integration module can also provide a recommendation to the user on how to capture a media file to accelerate and increase an accuracy of a code extraction process for a classified portion of a media file for integration into the development code.

Figure 1:
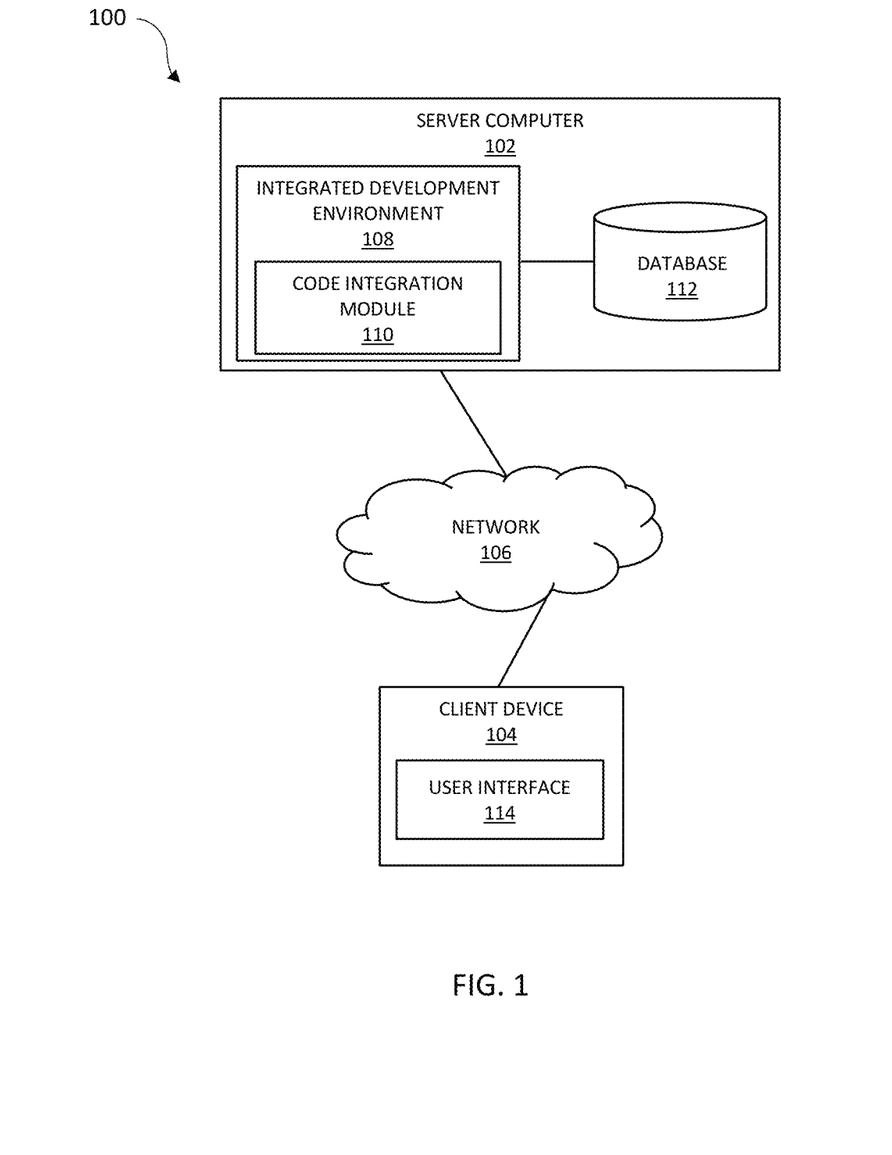
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102 and client device 104, interconnected over network 106. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104 and other computing devices (not shown) within the distributed data processing environment via network 106. In another embodiment, server computer 102 represents a computing system utilizing clustered computers and components (e.g., database server computers, application server computers, etc.) that act as a single pool of seamless resources when accessed within the distributed data processing environment. Server computer 102 includes integrated development environment 108 with code integration module 110 and database 112. Server computer 102 may include internal and external hardware components, as depicted and described in further detail with respect to FIG. 4.

Client device 104 can be a laptop computer, a tablet computer, a smart phone, smart watch, a smart speaker, or any programmable electronic device capable of communicating with various components and devices within the distributed data processing environment, via network 106. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 106. In one embodiment, client device 104 represents one or more devices associated with a user. Client device 104 includes an instance of user interface 114 displaying content and interacting with integrated development environment 108 with code integration module 110.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks capable of receiving and transmitting data, voice, and/or video signals, including multimedia signals that include voice, data, and video information. In general, network 106 can be any combination of connections and protocols that will support communications between server computer 102 and client device 104, and other computing devices (not shown) within the distributed data processing environment.

Integrated development environment 108 is software utilized by a user of client device 104 for creating applications that combing common developer tools into a single graphical user interface (GUI) with which a user interacts through user interface 114. Integrated development environment 108 includes code integration module 110 for integrating software code sourced from a media file into development code. Code integration module 110 receives a media file for code generation from database 112 or a web-based media content provider. Code integration module 110 identifies textual content relating to code in the media file and identifies code in the media file based on the textual content. Code integration module 110 classifies portions of the media files based on code functionality and stores the classified portions of the media file in a media library associated with integrated development environment 108. Code integration module 110 compares portions of development code that a user is interacting with to the classified portions of the media file and identifies a classified portion of the media file for integration into the development code.

In the event code integration module 110 does not receive a user confirmation for integrating the identified classified portion of the media file, code integration module 110 receives a user selection for a classified portion of the media file for integration into the development code and extracts the code from the classified portion of the media file. In the event code integration module 110 receives a user confirmation for integrating the identified classified portion of the media file, code integration module 110 extracts the code from the classified portion of the media file. Subsequent to extracting the code, code integration module 110 integrates the extracted code from the classified portion of the media file into the development code.

Database 112 is a repository for data used by code integration module 110. In the depicted embodiment, database 112 resides on server computer 102. In another embodiment, database 112 may reside on client device 104 or elsewhere within the distributed data processing environment provided code integration module 110 has access to database 112. A database is an organized collection of data. Database 112 can be implemented with any type of storage device capable of storing data and media files that can be accessed and utilized by code integration module 110, such as a database server, a hard disk drive, or a flash memory. Database 112 stores the data and the media files used by code integration module 110, such as, images with code snippets and videos with code snippets.

User interface 114 enables a user to make requests of or issue commands to client device 104 and receive information and instructions in response. In one embodiment, a user of client device 104 accesses user interface 114 via voice commands in natural language. In one embodiment, user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 114 may also be mobile application software. In an example, mobile application software, or an "app," is a computer program designed to run on smart phones, tablet computers and other mobile devices. User interface 114 enables a user of client device 104 to interact with integrated development environment 108 and code integration module 110.

Figure 2:
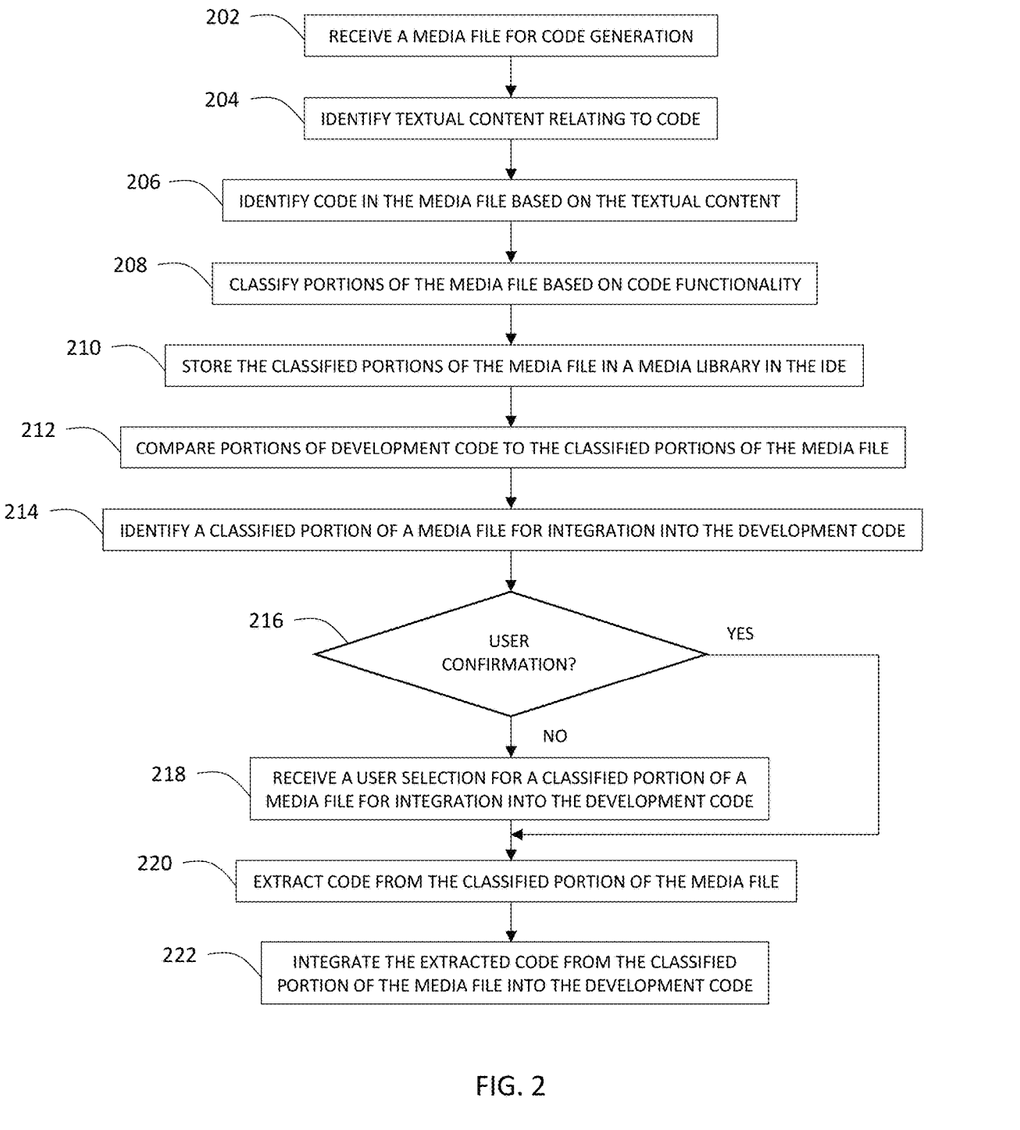
FIG. 2 is a flowchart depicting of a code integration module for integrating software code sourced from media files, in accordance with an embodiment of the present invention.

FIG. 2 is a flowchart depicting of a code integration module for integrating software code sourced from media files, in accordance with an embodiment of the present invention.

Code integration module 110 receives a media file for code generation (202). The media file represents an image with at least one code snippet or a video with at least one code snippet, where a code snippet includes one or more lines of code. In one embodiment, code integration module 110 receives a media file for code generation from a user of an integrated development environment (IDE), where the user uploads an image (e.g., screenshot) or a video (e.g., tutorial video) with the code snippets. Code integration module 110 also allows for the user of the IDE to provide a link to a web-based media content platform that is hosting the media file, where code integration module 110 accesses the media file through the provided link to the web-based media content platform to obtain the media file. With every media file that code integration module 110 receives, code integration module 110 retains the media file in a database for utilization in a media file library in the IDE.

Code integration module 110 identifies textual content relating to code (204). Code integration module 110 performs video analysis on the media file to identify textual content relating to code. The textual content can include but is not limited to closed captioning, a title for the media file, a file name for the media file, an associated description for the media file, text displayed in single frame of a video file, text displayed in an image file, and metadata associated with the media file. Closed captioning represents displayable text in the media file that provides additional or interpretive information. For example, if a media file is a tutorial video of a professor teaching coding techniques, the closed captioning can include audible words spoken by the professor during the tutorial video. An associated description includes a brief overview for the media file. For example, if a media file is the tutorial video of the professor teaching coding techniques, the description can include a summary of the coding techniques and a link to a portion of the tutorial video associated with a specific technique being taught. Text displayed in a single frame or a video file or an image file, includes text identifiable by the code integration module 110 through the video analysis. For example, if a media file is a tutorial video of a professor teaching coding techniques where the professor transitions between a camera classroom view and screen sharing view with a coding program, code integration module 110 can identify text on a display board in the camera classroom view and text in the screen sharing view with the coding program. In one embodiment, code integration module 110 identifies textual content relating generally to code, where the textual content is not specific to the development code that the user is modifying in the IDE. In another embodiment, code integration module 110 identifies textual content relating to code specific to one or more function in the development code that the user is modifying in the IDE.

Code integration module 110 identifies code in the media file based on the contextual content (206). Code integration module 110 utilizes the contextual content to identify snippets of code present in the media file and associates the identified snippets of code with one or more functions. In one example, a video file includes a professor teaching an online class how to perform function A, while going through a step-by-step process for creating a snippet of code associated with function A. The step-by-step process for creating the snippet of code associated with function A is presented by the professor as part of a screen share for a software coding program. Based on the previously identified contextual content, code integration module 110 identifies the code relates to function A and code integration module 110 performs text detection and recognition on the video to identify the code snippet being presented by the professor in the step-by-step process. In another example, an image file includes a screenshot of a snippet of code in a software coding program. Based on the previously identified contextual content, code integration module 110 identifies the code relates to function B based on a file name for the media file. Code integration module 110 performs text detection and recognition on the image with the screenshot to identify the code snippet associated with function B.

Code integration module 110 classifies portions of the media file based on code functionality (208). Code integration module 110 classifies portions of the media file based on code functionality for the previously identified code in the media file. In one example, a video file includes a professor teaching an online class how to perform functions A, B, and C, while going through a step-by-step process for creating a snippet of code associated with each function A, B, and C. Code integration module 110 identifies code in the video file based on the contextual content and associates a first snippet of code in a first portion of the video with function A, a second snippet of code in a second portion of the video with function B, and a third snippet of code in a third portion of the video with function C. Code integration module 110 classifies the portions of the video files based on code functionality (i.e., function A, function B, and function C) for future utilization in development code that a user is modifying in an IDE. In another example, an image file includes a screenshot of a snippet of code in a software coding program, where code integration module 110 identifies code relating to function D in the screenshot. Code integration module 110 classified the image file with the snippet of code based on functionality (i.e., function D) for future utilization in development code that user is modifying in an IDE.

Code integration module 110 stores the classified portions of the media file in a media library in the IDE (210). Code integration module 110 stores the classifieds portions of the media file in the media library in the IDE, where the media library is searchable by code integration module 110 and a user of the IDE modifying development code.

Code integration module 110 compares portions of development code to the classified portions of the media file (212). As the user modifies development code in the IDE, code integration module 110 compares portions of the development code to the classified portions of the media files available in the media library in the IDE. Code integration module 110 analyzes the development code being modified for one or more required functions and compares the one or more required functions to the various code functions of the classified portions of the media files.

Code integration module 110 identifies a classified portion of a media file for integration into the development code (214). Based on the comparison between the one or more required functions in the development code and the various code functions of the classified portions of the media files, code integration module 110 identifies a classified portion of a media file for integration into the development code. The classified portion of the media file for integration into the development code includes one or more code snippets for one or more functions for integration into the development code being modified by the user in the IDE. In one embodiment, code integration module 110 displays an overlay in the IDE with the media file and highlights the classified portion of the media that includes a code snippet for integration into the development code. In another embodiment, code integration module 110 highlights the media file in the media library section of the IDE, where code integration module 110 also highlights a portion of the media with the identified portion with a code snippet for integration into the development code. Code integration module 110 can provide a recommendation to the user with the identified classified portion of the media file and a summary of the media file with the code snippet associated with the identified classified portion.

Code integration module 110 determines whether a user confirmation was received (decision 216). As discussed above, code integration module 110 can highlight the media file in the media library section of the IDE, where code integration module 110 also highlights a portion of the media with the identified portion with a code snippet for integration into the development code. Code integration module 110 can display a notification where a user inputs a confirmation for integrating the identified classified portion of the media. In the event code integration module 110 determines a user confirmation was not received by the user rejecting the classified portion ("no" branch, decision 216), code integration module 110 receives a user selection for a classified portion of a media file for integration into the development code (218). In the event code integration module 110 determines a user confirmation was received ("yes" branch, decision 216), code integration module 110 extracts code from the classified portion of the media file (220).

Code integration module 110 receives a user selection for a classified portion of a media file for integration into the development code (218). If the user previously rejected integrating the identified classified portion of the media file, code integration module 110 allows for the user to search the media library based on a described code functionality and select another classified portion of a media file for integration into the development code. The media library allows for the user to perform a search based on a desired functionality of a code and select an appropriate classified portion of the media file for integration into the development code. Based on the user selection of another classified portion and the previous rejection of the classified portion, code integration module 110 learns for a future identification of code snippets from a classified portion of a media file for integration into the development code. For example, a user previously rejected integrating code snippet A for a first identified classified portion of a media file relating to function B. Subsequently, code integration module 110 receives a user selection for integrating code snippet B for a second identified classified portion of a media file relating to function B, where code snippet B is a different method of performing function B compare to code snippet A. Code integration module 110 learns this distinction for a future identification of code snippets from a classified portion of a media file for integration into the development code, where code integration module 110 identifies code snippet B rather than code snippet A to perform function B.

Code integration module 110 extracts code from the classified portion of the media file (220). For an instance where the media file is an image file, code integration module 110 extracts text (i.e., letters, numbers, and symbols) from the classified portion of the media file and based on the extracted text, generates the code for integration into the development code to perform a desired function. For an instance where the media file is a video file, code integration module 110 extracts text (i.e., letters, numbers, and symbols) from multiple frames of the classified portion of the media file. Code integration module 110 compiles the extracted text from the multiple frames of the classified portions and generates the code for integration into the development code. During the compiling of the extracted text from the multiple frames, code integration module 110 can identify additions and deletion that occur between the multiple frames of the classified portion of the video file. Code integration module 110 generates a final code for integration into the development code to perform a desired function.

Code integration module 110 integrates the extracted code from the classified portion of the media file into the development code (222). Code integration module 110 integrates the extracted code from the classified portion of the media via the IDE into the development code, where the user can simultaneously view code integration module 110 compiling the final code. If a compilation error occurs during the integration between the extracted code and the development code, code integration module 110 generates an error notification, where a user can take a corrective action to resolve the compilation error. Code integration module 110 learns the corrective action and subsequently performs the corrective action for a future integration of extracted code from a classified portion of a media file relating to a similar function. Code integration module 110 continuously learns how the extracted code is integrated into the development code and can provide the user with recommendations for future integrations between the extracted code and the development code.

Figure 3:
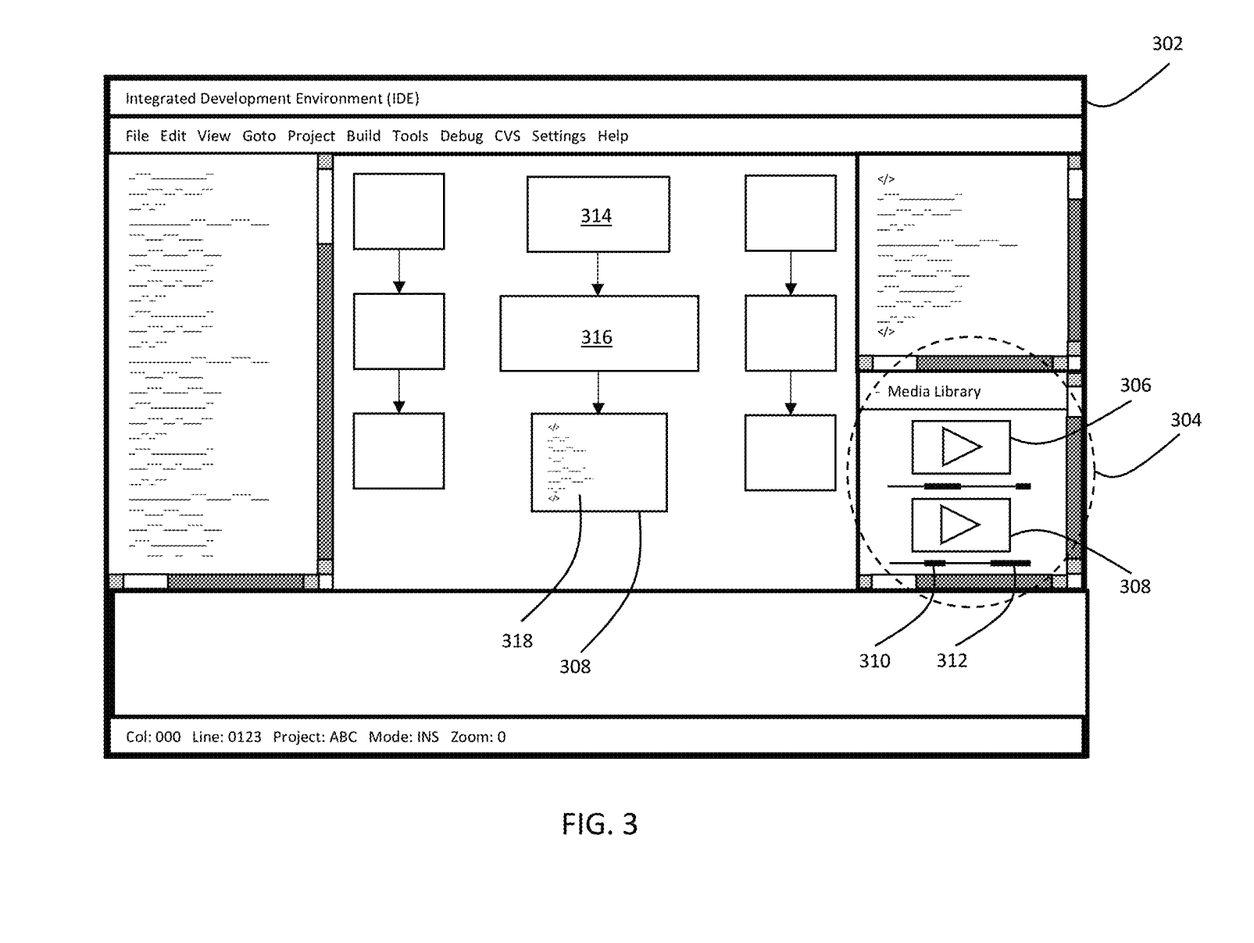
FIG. 3 illustrates an example of a code integration module operating in an integrated development environment, in accordance with an embodiment of the present invention.

FIG. 3 illustrates an example of a code integration module operating in an integrated development environment, in accordance with an embodiment of the present invention.

In this embodiment, integrated development environment is a software utilized by a user of a client device for creating applications that combing common developer tools into a single graphical user interface (GUI) with which a user interacts through user interface 302. User interface 302 includes media library 304 provided by code integration module 110 for storing classified portions of media files based on code functionality, where code integration module 110 previously identified code in the media files based on textual content located in media library 304. Media file 306 and 308 each represent a video file, where each media file 306 and 308 includes classified portions with code snippets for integration into development code being modified by the user. For media file 308, first classified portion 310 includes a first code snippet associated with a first function and second classified portion 312 includes a second code snippet associated with a second function.

As the user modifies the development code in the integrated development environment, code integration module 110 compares portions of the development code, such as development code portion 314 and 316, and identifies a classified portion of a media file in media library 304 for integration into the development code based on development code portion 314 and 316. In this embodiment, code integration module 110 identifies second classified portion 312 of media file 308 as including a second code snippet with a second function for integration into the development code. In response to receiving a user confirmation to integrate the second code snippet with the second function into the development code, code integration module 110 extracts code 318 (i.e., the second code snippet) from second classified portion 312 of media file 308 and integrates code 318 into the development code in the integrated development environment.

Figure 4:
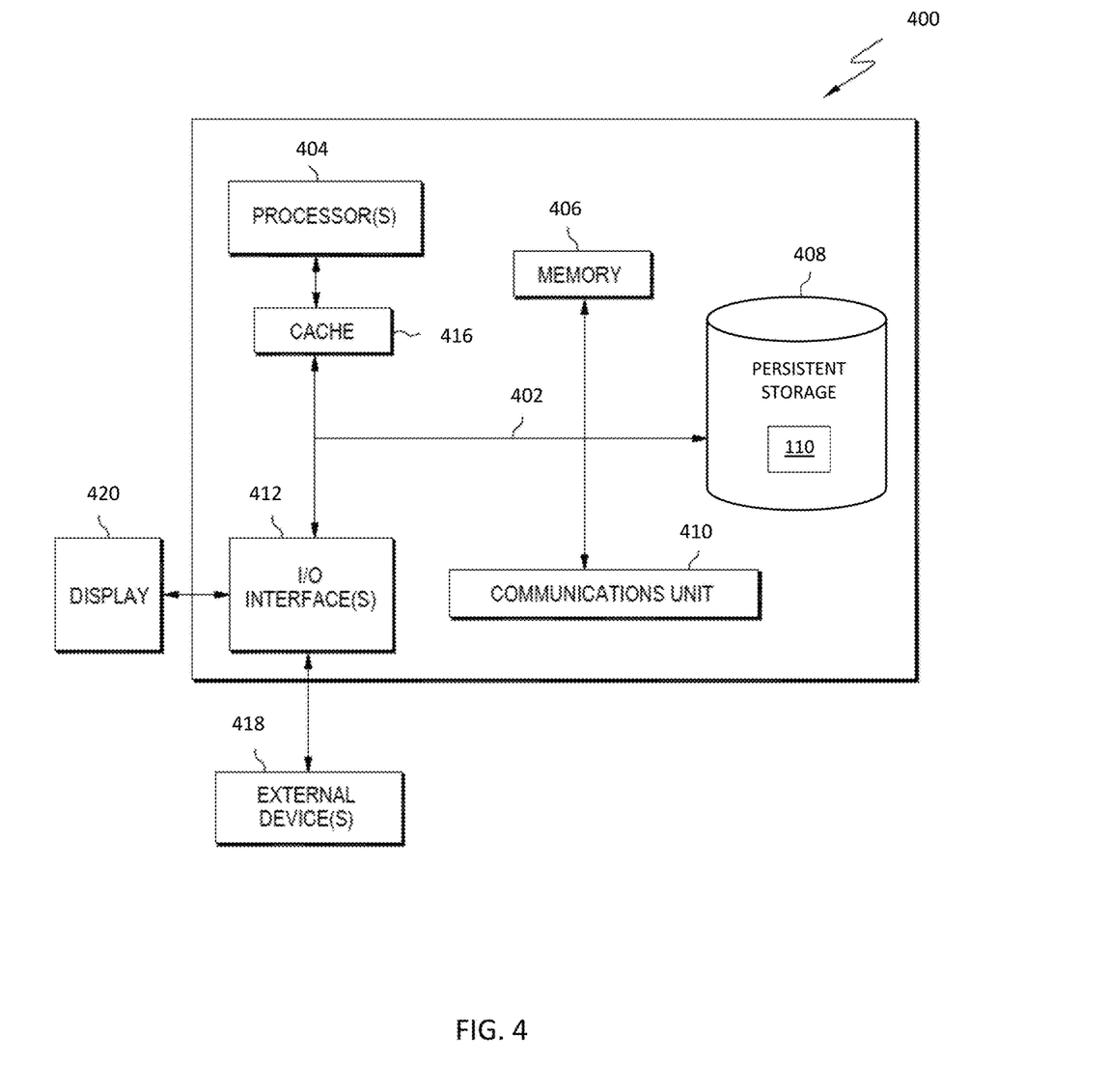
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes code integration module 110. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
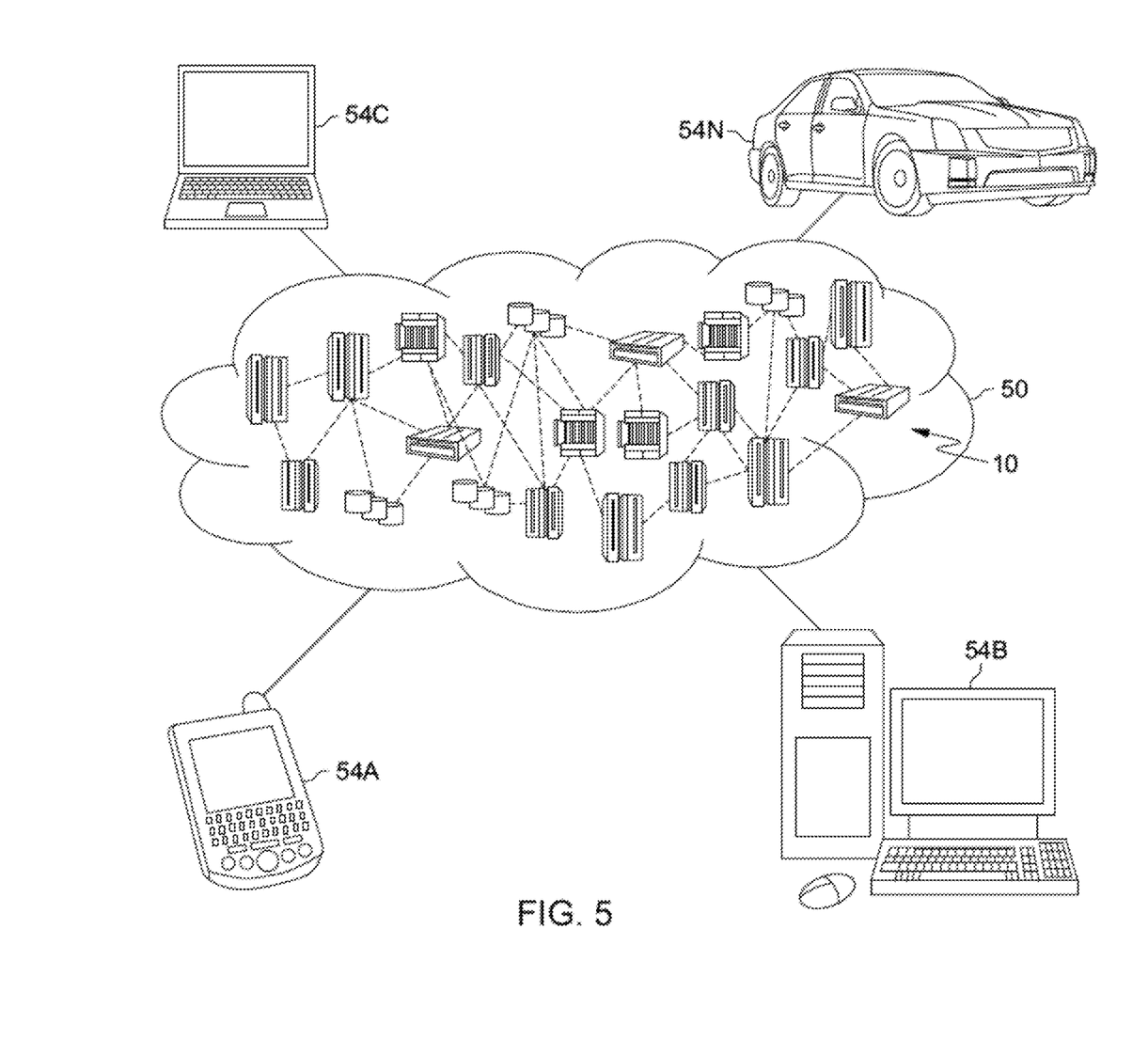
FIG. 5 depicts a cloud computing environment, in accordance with an embodiment of the present invention.
Figure 6:
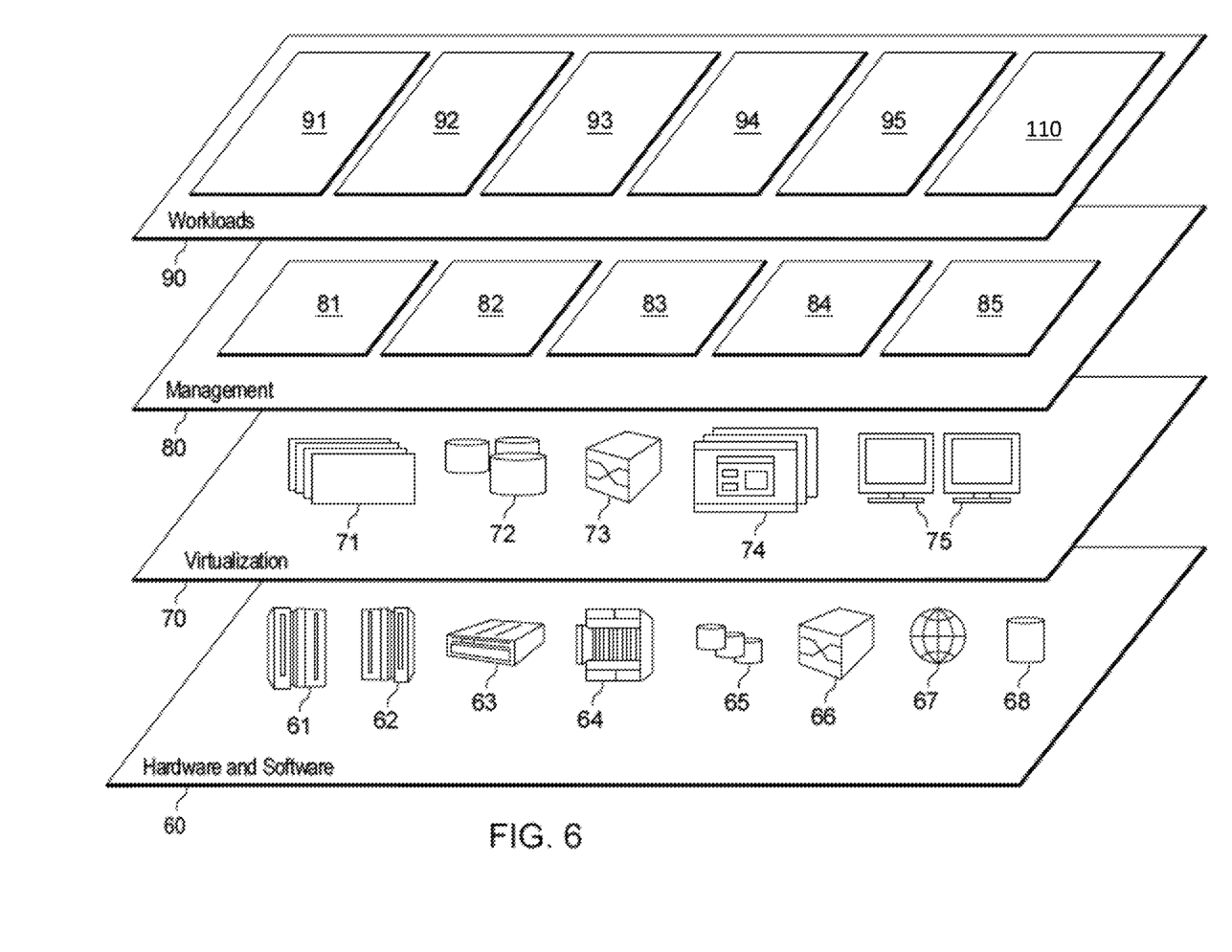
FIG. 6 depicts abstraction model layers, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code integration module 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
identifying textual content relating to code associated with a plurality of media files that includes a first media file, wherein a portion of the textual content includes an associated description with a summary of coding techniques presented in the first media file;
comparing portions of development code in an integrated development environment to a plurality of classified portions presented in the plurality of media files;
identifying a first classified portion presented in the first media file from the plurality of media files for integration into the development code based on the portion of the textual content, wherein the first classified portion includes a first snippet of code associated with a first function;
responsive to receiving a user confirmation, extracting, from the first media file, the first snippet of code associated with the first function; and
integrating the first snippet of code associated with the first function into the development code in the integrated development environment.

2. The method of claim 1, further comprising:
identifying the first snippet of code presented in the first media file based on the portion of textual content;
classifying the first snippet of code based on at least the first function, wherein the first snippet of code is associated with the first classified portion of the first media file from the plurality of classified portions of the plurality of media files; and
storing the first classified portion of the first media file in a media library in the integrated development environment.

3. The method of claim 2, wherein the textual content is selected from a group consisting of: closed captioning, a title for the first media file, a file name for the first media atoll text displayed in single frame of a video in the first media file, text displayed in an image in the first media file, and metadata associated with the first media file.

4. The method of claim 1, further comprising:
identifying a second classified portion of the first media file from the plurality of media files for the integration into the development code, wherein the second classified portion includes a second snippet of code associated with a second function;

responsive to receiving a user rejecting the second classified portion, receiving a user selection with a third classified portion of a second media file from the plurality of media files for the integration into the development code, wherein the third classified portion includes a third snippet of code associated with the second function;
extracting the third snippet of code associated with the second function; and
integrating the third snippet of code associated with the second function into the development code in the integrated development environment.

5. The method of claim 1, further comprising:
responsive to identifying a compilation error, generating an error notification with the compilation error between the first code snippet and the development code.

6. The method of claim 1, wherein extracting the first snippet of code associated with the first function further comprises:
extracting text from an image of the first classified portion of the first media file, wherein the text includes a plurality of letters, numbers, and symbols; and
generating, based on the text, the first snippet of code for the integration into the development code to perform the first function.

7. The method of claim 1, wherein extracting the first snippet of code associated with the first function further comprises:
extracting text from a plurality of frames in a video of the first classified portion of the first media file, wherein the text includes a plurality of letters, numbers, and symbols;
identifying a first text addition and a first text deletion that occur between the plurality of framed in the video; and
generating, based on the text with the first text addition and the first text deletion, the first snippet of code for the integration into the development code to perform the first function.

8. A computer program product comprising one or more computer readable storage media and program instructions collectively stored on the one or more computer readable storage media, the stored program instructions executable by one or more computer processors, the stored program instructions comprising:
program instructions to identify textual content relating to code associated with a plurality of media files that includes a first media file, wherein a portion of the textual content includes an associated description with a summary of coding techniques presented in the first media file;
program instructions to compare portions of development code in an integrated development environment to a plurality of classified portions presented in a plurality of media files;
program instructions to identify a first classified portion presented in the first media file from the plurality of media files for integration into the development code based on the portion of the textual content, wherein the first classified portion includes a first snippet of code associated with a first function;
program instructions to, responsive to receiving a user confirmation, extract, from the first media file, the first snippet of code associated with the first function; and
program instructions to integrate the first snippet of code associated with the first function into the development code in the integrated development environment.

9. The computer program product of claim 8, the stored program instructions further comprising:
program instructions to identify the first snippet of code presented in the first media file based on the portion of the textual content;
program instructions to classify the first snippet of code based on at least the first function, wherein the first snippet of code is associated with the first classified portion of the first media file from the plurality of classified portions of the plurality of media files; and
program instructions to store the first classified portion of the first media file in a media library in the integrated development environment.

10. The computer program product of claim 9, wherein the textual content is selected from a group consisting of: closed captioning, a title for the first media file, a file name for the first media file, text displayed in single frame of a video in the first media file, text displayed in an image in the first media file, and metadata associated with the first media file.

11. The computer program product of claim 8, the stored program instructions further comprising:
program instructions to identify a second classified portion of the first media file from the plurality of media files for the integration into the development code, wherein the second classified portion includes a second snippet of code associated with a second function;
program instructions to, responsive to receiving a user rejecting the second classified portion, receive a user selection with a third classified portion of a second media file from the plurality of media files for the integration into the development code, wherein the third classified portion includes a third snippet of code associated with the second function;
program instructions to extract the third snippet of code associated with the second function; and
program instructions to integrate the third snippet of code associated with the second function into the development code in the integrated development environment.

12. The computer program product of claim 8, the stored program instructions further comprising:
program instructions to, responsive to identifying a compilation error, generate an error notification with the compilation error between the first code snippet and the development code.

13. The computer program product of claim 8, wherein extracting the first snippet of code associated with the first function, the stored program instructions further comprises:
program instructions to extract text from an image of the first classified portion of the first media file, wherein the text includes a plurality of letters, numbers, and symbols; and
program instructions to generate, based on the text, the first snippet of code for the integration into the development code to perform the first function.

14. The computer program product of claim 8, wherein extracting the first snippet of code associated with the first function, the stored program instructions further comprises:
program instructions to extract text from a plurality of frames in a video of the first classified portion of the first media file, wherein the text includes a plurality of letters, numbers, and symbols;
program instructions to identify a first text addition and a first text deletion that occur between the plurality of framed in the video; and
program instructions to generate, based on the text with the first text addition and the first text deletion, the first snippet of code for the integration into the development code to perform the first function.

15. A computer system comprising:
one or more computer processors;
one or more computer readable storage media; and
program instructions stored on the computer readable storage media for execution by at least one of the one or more computer processors, the program instructions comprising:
program instructions to identify textual content relating to code associated with a plurality of media files that includes a first media file, wherein a portion of the textual content includes an associated description with a summary of coding techniques presented in the first media file;
program instructions to compare portions of development code in an integrated development environment to a plurality of classified portions presented in a plurality of media files;
program instructions to identify a first classified portion presented in the first media file from the plurality of media files for integration into the development code based on the portion of the textual content, wherein the first classified portion includes a first snippet of code associated with a first function;
program instructions to, responsive to receiving a user confirmation, extract, from the first media file, the first snippet of code associated with the first function; and
program instructions to integrate the first snippet of code associated with the first function into the development code in the integrated development environment.

16. The computer system of claim 15, the stored program instructions further comprising:
program instructions to identify the first snippet of code presented in the first media file based on the portion of the textual content;
program instructions to classify the first snippet of code based on at least the first function, wherein the first snippet of code is associated with the first classified portion of the first media file from the plurality of classified portions of the plurality of media files; and
program instructions to store the first classified portion of the first media file in a media library in the integrated development environment.

17. The computer system of claim 16, wherein the textual content is selected from a group consisting of: closed captioning, a title for the first media file, a file name for the first media file, text displayed in single frame of a video in the first media file, text displayed in an image in the first media file, and metadata associated with the first media file.

18. The computer system of claim 15, the stored program instructions further comprising:
program instructions to identify a second classified portion of the first media file from the plurality of media files for the integration into the development code, wherein the second classified portion includes a second snippet of code associated with a second function;
program instructions to, responsive to receiving a user rejecting the second classified portion, receive a user selection with a third classified portion of a second media file from the plurality of media files for the integration into the development code, wherein the third classified portion includes a third snippet of code associated with the second function;
program instructions to extract the third snippet of code associated with the second function; and
program instructions to integrate the third snippet of code associated with the second function into the development code in the integrated development environment.

19. The computer system of claim 15, the stored program instructions further comprising:
program instructions to, responsive to identifying a compilation error, generate an error notification with the compilation error between the first code snippet and the development code.

20. The computer system of claim 15, wherein extracting the first snippet of code associated with the first function, the stored program instructions further comprises:
program instructions to extract text from an image of the first classified portion of the first media file, wherein the text includes a plurality of letters, numbers, and symbols; and
program instructions to generate, based on the text, the first snippet of code for the integration into the development code to perform the first function.

* * * * *